United States Patent

[11] 3,625,846

| [72] | Inventors | Henry Drummond Murdoch;<br>Stephen Mark Lesley Hamblyn, both of<br>Surry, England |
|---|---|---|
| [21] | Appl. No. | 737,464 |
| [22] | Filed | June 17, 1968 |
| [45] | Patented | Dec. 7, 1971 |
| [73] | Assignee | United States Borax & Chemical<br>Corporation<br>Los Angeles, Calif. |
| [32] | Priority | July 3, 1967 |
| [33] | | Great Britain |
| [31] | | 30,545/67 |

[54] CHEMICAL PROCESS AND APPARATUS UTILIZING A PLASMA
14 Claims, 3 Drawing Figs.

[52] U.S. Cl. .................................................. 204/164, 204/312, 204/323
[51] Int. Cl. ..................................................... C01b 35/00, B01k 1/00
[50] Field of Search ........................................... 204/164, 177, 312, 323

[56] References Cited
UNITED STATES PATENTS

| 1,046,043 | 12/1912 | Weintraub | 204/164 |
| 1,074,672 | 10/1913 | Weintraub | 204/164 |
| 2,837,654 | 6/1958 | Berghaus et al. | 204/312 |
| 2,945,797 | 7/1960 | Cherrier | 204/164 |
| 3,049,488 | 8/1962 | Jackson et al. | 204/177 |
| 3,149,490 | 12/1968 | Petrescu et al. | 204/323 |
| 3,424,661 | 1/1969 | Androshuk et al. | 204/164 |

*Primary Examiner*—F. C. Edmundson
*Attorney*—James R. Thornton

ABSTRACT: Process and apparatus for effecting chemical reaction in a plasma in which a plasma is formed by radio frequency coupling, one reactant is fed into the plasma downstream from the center of the plasma and another reactant is fed into the plasma-forming stream or into the formed plasma. For example, very fine elemental boron can be produced by reduction of a boron halide with hydrogen.

CHEMICAL PROCESS AND APPARATUS UTILIZING A PLASMA

This invention relates to a method of effecting a chemical reaction at high temperature, and to apparatus for use in this method.

The method of this invention is in general applicable to any two or more reactants whose reaction takes place only at high temperature, and is particularly useful for two reactants whose product of reaction is a solid. The solid product of the process of this invention is in finely divided form, and by varying parameters of operation of the process the particle size of the product can, within limits, be controlled at will. An example of the high-temperature reaction between two reactants which can be effected by this invention is the reduction of a volatile halide of a metal or metalloid, for example the reduction of a boron halide, with a reducing gas such as hydrogen, to produce elemental boron.

A process for the reaction between a boron halide and hydrogen to produce elemental boron has been previously disclosed. This process consists of forming a plasma of argon, feeding the boron trihalide into the ionized argon, and feeding hydrogen either into the ionized argon together with the boron halide or into the argon before it is ionized so that the hydrogen also is ionized and forms part of the plasma. According to this process the plasma is formed in a plasma torch, that is the plasma-forming gas is passed between a cathode and an anode across which a low-voltage high-current arc is maintained. Thus in the prior process there is used an arc plasma. By injection of boron trichloride into an arc plasma there is obtained elemental boron in particle sizes ranging from about 25 microns up to 300 microns. The prior disclosure refers to the need to grind the product, and grinding of boron is difficult and can introduce undesirable impurities.

By the process of the present invention, elemental boron can be produced from boron halide by reduction with hydrogen in a plasma, but a very much finer product is obtained, with a mean particle size of 1 to 2 microns and a range of less than 1 up to about 10 microns. Furthermore, a product purity of substantially above 99 percent can be obtained. We have found it possible to do this by forming a plasma by radio frequency coupling instead of by an arc and by control of the location at which the material fed into the plasma contacts it.

According to the present invention, there is provided a method of effecting a chemical reaction between at least two reactants which comprises continuously passing a stream of a gas which may include one of the reactants through a reaction zone, forming a plasma of the gas within the reaction zone by radio frequency coupling, feeding one reactant into the plasma at a point downstream of the center of the plasma in the direction of gas flow, feeding another of said reactants into said plasma-forming stream or into the formed plasma thereby forming a gas stream containing the product of high-temperature reaction and separating said product from the gas stream.

In the usual form of this process one reactant is present in or constitutes the gas forming the plasma and a second reactant is fed into the plasma. In that case the plasma is preferably formed from a gas mixture passed into the reaction zone which consists of one of the reactants together with a gas which is ionized more readily than said reactant and is inert to the reactants. Preferably also the other reactant which is fed into the formed plasma is fed in gas form. In an alternative form of this process there is formed a plasma of an inert gas and two reactants are fed into the plasma. A suitable inert gas, when one is used, is argon.

A coupled plasma can be formed either by an oscillating magnetic field, which gives a plasma of the so-called "H" type, or by an alternating electric field established between two conductors, which gives a plasma of the so-called "E" type. While our process may be operated, somewhat inefficiently, with capacitive coupling it is preferred to use inductive coupling and to form an "H" type plasma.

Our process is particularly suitable for the preparation of finely divided elemental boron by reduction of a boron halide such as boron trichloride, boron tribromide, boron trifluoride, and mixtures thereof, with hydrogen.

Thus, in one aspect the present invention provides a process for the preparation of finely divided elemental boron by reaction of a boron halide with hydrogen which comprises continuously passing a first stream of a gas which is one of said reactants through a reaction zone, forming a plasma of the gas within the reaction zone by inductive coupling, feeding a second stream of gas which is the other of said reactants into the plasma at a point downstream of the center of the plasma in the direction of gas flow, thereby forming a gas stream containing elemental fine-sized boron, separating the boron from the gas stream and recovering the boron. In this process for the preparation of finely divided boron, the gas of which the plasma is formed is usually a mixture of an inert gas (e.g. argon) and one of the reactants, preferably hydrogen. Alternatively the gas which is ionized can be just an inert gas, hydrogen being fed to the plasma along with the boron halide. If a mixture of inert gas and boron trihalide is used for initiating the plasma while hydrogen is fed into the formed plasma, it is possible (though with danger of extinction of the plasma flame) to reduce the quantity of argon to nil while maintaining the plasma, so that the first gas consists of boron halide while the second gas consists of hydrogen. In each of these ways the boron halide is reduced and hydrogen chloride is present in the product-containing gas stream. The preferred boron halide in this process is boron trichloride, although the other boron halides can also be used.

The invention is not limited to the reduction of a boron halide with hydrogen. Instead of reduction of a boron halide, there can be effected reduction with hydrogen of a volatile halide of a metal or another metalloid; or there can be effected reaction between a volatile halide of a metal or metalloid and a gas such as ammonia, a carbon perhalide, hydrogen sulfide, or a phosphorus halide. Reduction with hydrogen produces the elemental metal or metalloid; reaction with the other gases gives the nitride, carbide, sulfide or phosphide, respectively, of the metal or metalloid. Specific examples of these reactions are: boron trichloride with ammonia to form baron nitride; silicon tetrachloride with ammonia to form silicon nitride; aluminum tetrachloride with ammonia to form aluminum nitride; and boron trichloride with carbon tetrachloride to form boron carbide.

Another class of reactions possible by our process is those between a volatile halide of a metalloid and the halide of a refractory hard metal such as titanium, tungsten or hafnium; this reaction necessitates the use of hydrogen as a third reactant which will normally be the plasma. The reaction with a boron halide can be illustrated as follows $$BX_3 + MX \xrightarrow{H_2} BM + 4HX$$

where $X$ is a halogen and $M$ is a refractory hard metal. The halides of metals as well as of metalloids can be reacted according to our invention. For example, aluminum trichloride can be reacted with ammonia to give aluminum nitride. High-temperature reactions which can be effected by our process is thus the removal of the halogen from volatile halides of metals or metalloids and its optional replacement by another element. In such reaction, one reactant is present in or constitutes the gas forming the plasma and the second reactant is fed into the plasma.

The process of this invention can be used also for the formation of hydrazine from nitrogen and hydrogen or from ammonia and hydrogen, for the production of hydroxylamine from nitrogen, hydrogen and oxygen, for the production of hydrogen cyanide from nitrogen and a hydrocarbon, and for the synthesis of acetylene from methane.

It will be noted that in our process the interaction takes place only after the plasma has been formed, by feeding the reactant into the plasma at a point downstream of the center thereof in the direction of gas flow. This facilitates stabilization of the plasma (that is both formation of a plasma and its maintenance despite minor fluctuations in feed materials) and also makes it possible to control the particle size of the product, as the reactant fed to the plasma absorbs heat and so serves as a quench, the speed of quenching being one of the factors on which particle size depends.

In the process of the present invention, as the gas flows through the reaction zone and is subjected to radio frequency inductive heating, it is ionized so that a visible fireball occurs which is quite a sharp zone of brightness, having a definite center. Downstream of the bright zone the ionized gas cools, forming a progressively less bright tail. One of the reactants is injected into the tail or into the fireball downstream of its center.

Preferably the reactant fed into the plasma is delivered at an angle to the axis of gas flow. In that case the reactant fed into the plasma is delivered at an angle intermediate the direction radial to the gas flow and the direction axially countercurrent to the gas flow, that is to say while the gas moves downstream the compound is delivered in an upstream direction.

Rapidity of cooling is an important factor in determining the particle size of the product and for preventing reversion of the product to the starting material.

For the formation of elemental boron by reaction of boron halide, some care must be exercised to ensure that the feed meets the gas at an appropriate temperature. This can be readily ascertained experimentally and with the aid of theoretical calculations by adjusting the point at which the feed enters the plasma. When the boron is formed from boron trichloride this temperature should be about 2,000° C. During cooling to about 1,000° C. there is a tendency for the boron to react with the hydrogen chloride formed and for reversion to the original starting materials to occur, but the quantities of gas are such that this cooling is so rapid that very little equilibrium reversion occurs. For the formation of elemental boron from boron trifluoride, the trifluoride should be fed to the hydrogen plasma where it is at a temperature of about 4,000° C. Some quenching of the plasma after reaction is then desirable in order to produce a rapid fall in temperature to the temperature of about 500° C. at which substantial reversion no longer takes place. When boron tribromide is used as the feed reactant the reaction temperature can be as low as 900° C. and there is no serious problem with reversion on cooling; such low-reaction temperatures hardly necessitate use of a plasma. In general, the loss of heat from the inner hot zone of the plasma to the outer, cooler portions of the gas stream provides sufficient cooling for reversion to be substantially no problem without extraneous quenching.

Supplementary cooling of the plasma such as by withdrawal of heat from the tail of the plasma to circulating cooling water which surrounds the plasma-containing apparatus, can be adopted when this is found advantageous.

It is preferred when carrying out a chemical reaction according to this invention to carry the gas stream along a substantially straight path through the induction zone and thence to the separation. Separation is preferably effected centrifugally, such as in one or more cyclone separators since in this way an even back pressure can be established in the gas stream whereby the initiation and maintenance of an even plasma is facilitated.

After the product has been recovered from the gas stream, the gases, after any necessary washing to remove unwanted byproducts, can be recycled to the reaction zone.

It will be seen therefore that in addition to a method for effecting a chemical reaction at high temperature the present invention provides apparatus for use in a preferred mode of operation of the method. The apparatus of the invention comprises a generally cylindrical dielectric reaction vessel having preferably tangential inlet means for gas, a radio frequency induction coil surrounding a portion of said reaction vessel downstream of the inlet means so as to define therein a plasma-generating zone, and inlet means for a reactant which means are arranged to deliver the reactant into the vessel along a path inclined to the axis of said vessel on the side of the induction coil remote from said gas inlet.

We will next describe the invention in more detail with particular reference to the production of elemental boron from boron trichloride. Modifications of the process needed for other reactions will be apparent from this specific description.

The apparatus is illustrated in the accompanying drawings, of which

FIG. 1 is a diagram of the reaction apparatus and associated separator, while

Figure 2:
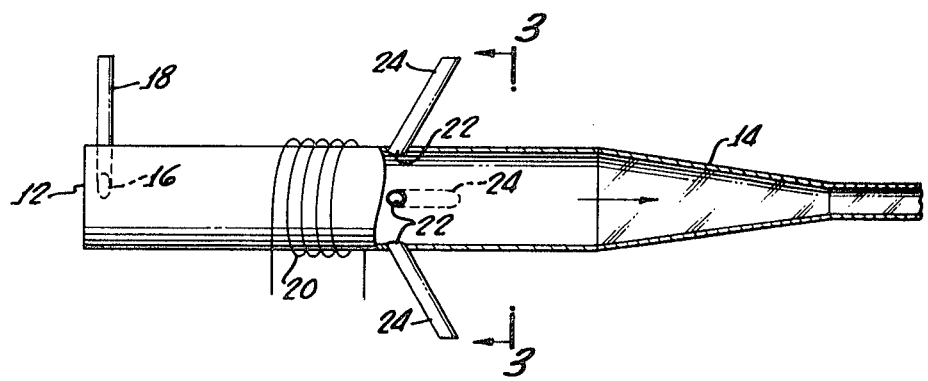
FIG. 2 is a more detailed sectional elevation of the reaction apparatus.
Figure 3:
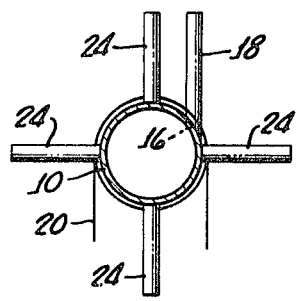
FIG. 3 is a fragmentary section taken along line 3—3 of FIG. 2.

Referring first to FIGS. 2 and 3, the apparatus includes a quartz tube 10 which can be about two inches in diameter and two feet long, closed at one end by a quartz cap 12 integral with the tube and open at its other end where it is connected to tapering glass tube 14 (glass being cheaper than quartz where resistance to the heat of a plasma is not required). An inlet port 16 in cap 12 is connected by a line 18 to a source of argon; the inlet port is arranged to deliver gas tangentially of the circular tube.

Downstream of the inlet port an induction coil 20 surrounds the tube, coil 20 being connected to a source of radio frequency power. The circumferentially spaced ports 22 are formed in tube 10 about 2 cm. downstream of the last turn of coil 20. The spacing between the coil and the ports can be varied so as to vary the point in the plasma at which a feed admitted through ports 22 contacts the ionized gas, thus varying the temperature at which the reaction takes place and the rapidity of cooling of the plasma. Port 22 is connected to respective quartz tubes 24, each tube 24 extending from its respective port axially downstream of the reaction tube and radially outwards therefrom, the angle between each glass tube and the reaction tube being in this embodiment 70°.

Figure 1:
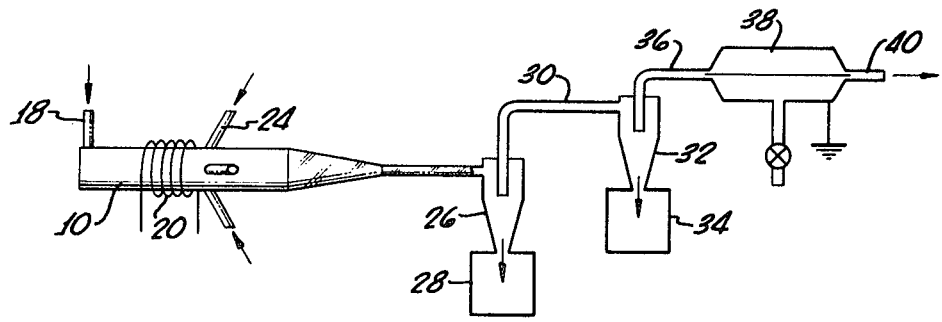

Referring now to FIG. 1, glass tube 14 extends for about four feet and communicates with a cyclone separator 26. It will be seen that from gas inlet 16 to first cyclone separator 26 gas has to follow a straight path, so that pressure pulses within the plasma are minimized. The fine separator is provided with a collector box 28 for coarse particles and a gas outlet 30 which communicates with a second cyclone separator 32 provided with a collecting box 34 for fine particles and a gas outlet 36. Outlet 36 communicates with an electrostatic precipitator 38, and the outlet 40 from which is connected gas washing apparatus (not shown). In use of the apparatus for the reduction of boron trichloride to boron, the preferred procedure is as follows: argon is fed into the reaction zone through port 16 and as it follows along the tube radio frequency power supplied to the coil at, for example, about 10 kw. is coupled inductively to the argon so that the argon ionizes to form a visible plasma within the region surrounded by coil 20. To facilitate formation of a plasma a spark may be struck in the argon by a Tesla coil, but it is not essential to strike a spark.

When the argon plasma has been formed so that the argon becomes conducting, hydrogen is mixed with the argon feed and the argon-hydrogen mixture is ionized, the power input at the same time being increased appropriately to 30 kw. If induction technique permitted the maintenance of a hydrogen plasma in the absence of a more readily ionizable inert gas such as argon, it would be possible according to the principles of this invention to feed pure hydrogen (or some other reactant gas when a different reaction is intended) into the plasma-forming zone.

The operating conditions, such as the relationship of the power input to the constituents of the gas mixture, the disposition of the coil, and the pressure of the gas mixture, can be adjusted to provide a fireball which is confined at the desired location within the tube and does not destroy the tube. Well established principles for this adjustment of operating conditions are described by Gray et al., The Chemical Engineer, No. 203, Nov. 1966, pages 313–321.

Gaseous boron trichloride is supplied to the plasma through ports 22, being directed countercurrent to the direction of gas flow which is marked by an arrow in FIG. 2. The proportions and flow rates of the gases are adjusted as described below, but when the ratio of boron trichloride to hydrogen exceeds that stoichiometrically necessary for formation of elemental boron, additional hydrogen can be fed into the plasma together with the boron trichloride through the said gas ports. This may be advantageous as an alternative to increasing the amount of hydrogen in the feed gas or to increasing the quantity of feed gas. Temperature within the plasma may vary from a few hundred degrees centigrade at the outside to 10,000° C. at the center. As is well known, exact measurements of temperature within the plasma are of limited practical value as the temperatures vary so rapidly over a minute distance; therefore it is preferred to establish the position of the feed inlet relative to the induction coil not so much by theoretical temperature considerations as by experimental methods. Some boron is deposited on the walls of the quartz tube but the bulk of it is deposited as a fine powder in the cyclone separators. After the boron has been separated from the gas stream, the gas stream is washed to remove hydrogen chloride (unreacted boron trichloride first being condensed out if desired) and then can be recycled. In recycling the hydrogen-argon mixture, care must be taken to replace the hydrogen that has been consumed and to avoid the disturbance of pressure conditions within the reaction zone. Recovered unreacted boron trichloride can also be recycled.

The quantities of the various gases fed into the reaction zone can be varied within wide limits so as to optimize the particle size, the yield relative to power input, the rate of production of the product, or the ease of washing and recycling unreacted gases. The argon-hydrogen mixture fed to the plasma-forming zone normally contains at least one part in 16 of argon in order to ensure plasma stability. In a typical run there are used 5 liters per minute of argon, 9 liters per minute of hydrogen and 16 liters per minute of boron trichloride. By increasing the quantity of hydrogen to e.g. 35–40 l./min. there are formed 2.5 grams per minute of elemental boron. At this rate the boron has particle sizes in the range of about 1–10 $\mu$, the average particle size being 1.5–2 $\mu$Fisher. Fine particle size can be promoted by supplying an inert gas together with the boron trichloride into the plasma. Small quantities of boron trichloride can be included in the gas mixture fed to the plasma-forming zone.

The finely divided boron produced by this process has the following characteristics: a purity of not less than 99.0 percent; a surface area as determined by the B.E.T. method in the range 44–7 m.$^2$/g; a moisture pickup of 0.5 percent by weight at 75 percent R.H. in 48 hours; and it is amorphous and nonpyrophoric.

The operating conditions and results of some typical runs carried out as described above are as follows:

| Argon (l./min.) | Hydrogen with BCl₃ (l./min.) | BCl₃ (g./min.) | Hydrogen (l./min.) | H₂/BCl₃ (mole/mole) | Power (kw.) | Yield (percent) | Purity (percent) | Particle size ($\mu$) |
|---|---|---|---|---|---|---|---|---|
| 40 | 25 | 73 | 13 | 2.84 | 16.7 | 21.5 | 99.5 | 0.75 |
| 10 | 10 | 81 | 30 | 2.61 | 22.5 | 29.0 | 99.0 | 1.70 |
| 10 | 12 | 100 | 35 | 2.46 | 20.3 | 26.0 | 99.4 | 1.75 |
| 8 | 9 | 83 | 31 | 2.52 | 19.0 | 31.4 | 99.4 | 1.40 |

Various changes and modifications of the invention can be made and, to the extent that such variations incorporate the spirit of this invention, they are intended to be included within the scope of the appended claims.

We claim:

1. In the method of effecting a chemical reaction between at least two reactants by continuously passing a stream of a plasma-forming gas through a reaction zone, forming a plasma of the gas within the reaction zone, and feeding at least one of the said reactants into the plasma-forming stream feeding at least a second reactant into the plasma at a point downstream of the center of the plasma and at an angle counter to the direction of flow of the gases, thereby forming a gas stream containing the product of high temperature reaction, cooling and separating said product from the gas stream, the improvement which comprises (a) forming said plasma by radio frequency inductive coupling and (b) feeding one of said reactants into the formed plasma at a point downstream of the center of the plasma in the direction of gas flow.

2. The method according to claim 1 in which the gas stream which is passed into the reaction zone consists of one of the reactants together with a gas which is ionized more readily than said reactant and is inert to the reactants.

3. The method according to claim 1 in which there is formed a plasma of an inert gas and two reactants are fed into the plasma.

4. The method according to claim 3 in which the inert gas is argon.

5. The method according to claim 1 in which the reactants are boron halide and hydrogen.

6. The method according to claim 5 in which said boron halide is boron trichloride.

7. The method according to claim 5 in which the plasma is formed from a mixture of hydrogen and argon, and the boron halide is fed into the plasma.

8. The process for the preparation of finely divided elemental boron by reduction of a boron halide with hydrogen which comprises continuously passing a first stream of a gas which is one of said reactants through a reaction zone, forming a plasma of the gas within the reaction zone by inductive coupling, feeding a second stream of gas which is the other of said reactants into the plasma at a temperature of at least about 2,000° C. at a point downstream of the center of the plasma in the direction of gas flow and at an angle counter to said gas flow thereby forming a gas stream containing elemental boron having a particle size of up to about 10 microns, rapidly cooling and separating the boron from the gas stream and recovering the boron.

9. The method according to claim 8 in which the gas stream forming the plasma is delivered to the reaction zone tangentially of the direction of gas flow through the reaction zone.

10. The method according to claim 8 in which the reactant fed into the plasma is delivered at an angle to the axis of gas flow.

11. The method according to claim 8 in which the first gas stream comprises argon and hydrogen and the second gas stream is the boron halide.

12. The method according to claim 11 in which said boron halide is boron trichloride.

13. Apparatus for carrying out a high-temperature reaction using an ionized gas which comprises a generally cylindrical dielectric reaction vessel having inlet means for the gas, a radio frequency induction coil surrounding a portion of said reaction vessel downstream of the inlet means so as to define therein a plasma-generating zone, inlet means for a reactant which means are arranged to deliver the reactant into the vessel along a path inclined to the axis of said vessel and counter to the direction of flow of gases on the side of the induction coil remote from said gas inlet, exit means for the reaction product which is in a straight path from said inlet means for the gas, and product separating means communicating with said exit means.

14. Apparatus as claimed in claim 13 in which the gas inlet is arranged to deliver gas tangentially to the direction of gas flow.

* * * * *

UNITED STATES PATENT OFFICE
CERTIFICATE OF CORRECTION

Patent No. 3,625,846     Dated December 7, 1971

Inventor(s) Henry Drummond Murdoch et al.

It is certified that error appears in the above-identified patent and that said Letters Patent are hereby corrected as shown below:

In Column 2, line 38, the word "baron" should read --boron--.

In Column 4, line 6, the word "separator" should read --separators--.

In Column 5, line 38, the word "μFisher" should read --μ Fisher--;

line 45, the numbers "44-7" should read --4-7--.

Signed and sealed this 4th day of July 1972.

(SEAL)
Attest:

EDWARD M. FLETCHER, JR.
Attesting Officer

ROBERT GOTTSCHALK
Commissioner of Patents